(12) United States Patent  
Chien

(10) Patent No.: US 9,377,337 B2
(45) Date of Patent: Jun. 28, 2016

(54) SYRINGE METER

(71) Applicant: TRUSVAL TECHNOLOGY CO., LTD., Miao-Li Hsien (TW)

(72) Inventor: Shih-Pao Chien, Miao-Li Hsien (TW)

(73) Assignee: TRUSVAL TECHNOLOGY CO., LTD., Miao-Li Hsien (TW)

( * ) Notice: Subject to any disclaimer, the term of this patent is extended or adjusted under 35 U.S.C. 154(b) by 65 days.

(21) Appl. No.: 14/511,132

(22) Filed: Oct. 9, 2014

(65) Prior Publication Data

US 2015/0202643 A1 Jul. 23, 2015

(30) Foreign Application Priority Data

Jan. 20, 2014 (TW) .............................. 103101968 A

(51) Int. Cl.
*B05B 11/00* (2006.01)
*G01F 3/20* (2006.01)
(52) U.S. Cl.
CPC ........................................ *G01F 3/20* (2013.01)
(58) Field of Classification Search
CPC ........................................................ G01F 3/20
USPC .................. 222/399, 386, 390, 105, 190, 282
See application file for complete search history.

(56) References Cited

U.S. PATENT DOCUMENTS

| 3,048,171 | A | * | 8/1962 | Grau | ...................... | A61M 5/145 128/DIG. 12 |
| 4,793,524 | A | * | 12/1988 | Starr | ......................... | B01J 4/02 222/309 |
| 4,886,189 | A | * | 12/1989 | Vanderjagt | ........... | B67D 7/0255 222/105 |
| 7,111,757 | B1 | * | 9/2006 | O'Brien | ................ | B01L 3/0206 222/1 |

* cited by examiner

*Primary Examiner* — Donnell Long
(74) *Attorney, Agent, or Firm* — Rabin & Berdo, P.C.

(57) ABSTRACT

A syringe meter is provided, including a supply tank, a container with variable capacity, a transmission set, an air supply tube, a liquid outlet tube, and a plurality of valve elements; wherein the container being a bellows tube having two ends sealed; the supply tank having a cyclic tube and a pump connected to bellows tube so that a liquid able to circulate in supply tank and bellows tube; the transmission set being for compressing or pull bellows tube; the air supply tube and the liquid outlet tube being connected to the container; and the plurality of valve elements being disposed at the positions where tubes connected to bellows tube. As such, the capacity of the bellows tube is adjusted for outputting a preset volume, or the transmission set is activated to compress or pull the bellows tube after filling with a liquid to control the output volume.

6 Claims, 7 Drawing Sheets

SYRINGE METER

CROSS-REFERENCE TO RELATED APPLICATION

The present application is based on, and claims priority form, Taiwan Patent Application No. 103101968, filed Jan. 20, 2014, the disclosure of which is hereby incorporated by reference herein in its entirety.

TECHNICAL FIELD

The technical field generally relates to a measurement technical field, and in particular, a container with variable capacity applied in a sealed tube to accurately control the output of the liquid.

BACKGROUND

The available measurement techniques include at least (a) measurement using overflow tank, (b) measurement using flow meter, and (c) measurement using fixed volume. FIG. 1 shows a schematic view of a structure of measurement using overflow tank. The overflow tank-based measurement includes a pump 11 to transport a liquid in a material tank 12 to a measurement tank 13. When the liquid overflows from an overflow tube 14 of the measurement tank 13, the transportation stops. Then, a valve 15 at the bottom of the measurement tank 13 is opened so that the liquid in the measurement tank 13 flows into a mixer tank 16 to complete the measurement. The structure has the following disadvantages:

1. The overflow-based measurement is not easy to change the measurement volume.
2. During measurement, the liquid material overflows from the overflow tube 14 cannot be easily reclaimed, resulting in waste.
3. After the valve 15 is opened, the liquid can only flow by the gravity. If the liquid has a higher viscosity, the flow speed can be very slow.
4. The liquid in the tube in stationary when not in measurement. If the liquid contains any grounded material, the grounded material may starts to settle at the bottom so that the total organic carbon (TOC) of the de-ionized water (DIW) tube increases.
5. The liquid flows in an open space, which may lead to environmental pollution.

The meter-based measurement includes computing the volume of the liquid by the flow rate and the time, which has the following disadvantages:

1. A system with unsteady flow rate may not be measured correctly, such as, a pump with ON and OFF interval.
2. A system with shared branches causing pressure change will affect the flow rate.
3. A larger tube is required for measuring high flow rate and a smaller is required for measuring low flow rate.
4. The liquid in the tube in stationary when not in measurement. If the liquid contains any grounded material, the grounded material may starts to settle at the bottom so that the total organic carbon (TOC) of the de-ionized water (DIW) tube increases.
5. The residual liquid in the intake tube will affect the measurement accuracy.

The fixed volume-based measurement includes using a dosing pump to transport a fixed volume of liquid through a pistol, which has the following disadvantages:

1. For higher precision, the volume is designed to be small, which amount to about 5lpm. Therefore, this approach is not suitable for measuring a large volume as the precision error will accumulate.
2. The liquid in the tube in stationary when not in measurement. If the liquid contains any grounded material, the grounded material may starts to settle at the bottom so that the total organic carbon (TOC) of the de-ionized water (DIW) tube increases.
3. The residual liquid in the intake tube will affect the measurement accuracy.

To solve the aforementioned disadvantages, it is imperative to devise a syringe meter to address the measurement issues.

SUMMARY

An objective of the present invention is to provide a measurement meter with variable capacity, applicable to a container with variable capacity. The container may be a bellow tube, which is used with a transmission mechanism to precisely control the compression or extension to achieve precise measurement of volume.

Another objective of the present invention is to provide a measurement meter applicable to a sealed cyclic tube to prevent the contents of the tubes from contacting air to reduce contamination risk. The contents of the cyclic tube stay flowing to reduce the risk of settlement of TOC. In addition, the pressure on the sealed cyclic tube can be increased to increase the flow rate and reduce the measurement time as well as reduce the risk of settlement of TOC.

Yet another objective of the present invention is to provide a measurement mode applicable to different states, such as, large volume (full output), small volume, or trace volume (partial output) so that a measurement meter can be used for various applications.

To achieve the above objectives, the present invention provides a syringe meter, including a supply tank, a container with variable capacity, a transmission set, at least an air supply tube, at least a liquid outlet tube, and a plurality of valve elements; wherein the container with variable capacity is a bellows tube having two ends sealed; the supply tank having a cyclic tube and at least a pump connected to the bellows tube so that a liquid able to flow in the supply tank and the bellows tube cyclically; the transmission set being for compressing or extending the bellows tube to change the capacity; the at least an air supply tube being connected to the container with variable capacity; the at least a liquid outlet tube being connected to the container with variable capacity; and the plurality of valve elements being disposed at the tubes connected to the bellows tube to control the closing and opening of the tubes.

In the present invention, the liquid outlet tube further includes a first liquid outlet tube, and the air supply tube is disposed at the top of the container with variable capacity. The first liquid outlet tube is disposed at the bottom of the container with variable capacity. Each of the connections between the air supply tube and the first liquid outlet tube and the container with variable capacity is disposed with a valve element. When both the valve elements are opened, the liquid contents inside the container will flow directly through the first liquid outlet tube due to the pressure. The above embodiment is a measurement mode for large volume. In operation, the transmission set controls and adjusts the capacity of the bellows tube and a fixed volume of liquid is injected into after each adjustment. After the valve is opened, the liquid inside the tube will flow directly and rapidly through the first liquid outlet tube for large volume measurement.

If a suitable amount of compensation is required during measurement, a small volume measurement mode can be used. In this mode, only a required volume of liquid is outputted. In this embodiment, the liquid outlet tube further includes a second liquid outlet tube, disposed at the top of the container with variable capacity. A valve element is disposed at the connection, and when the valve element is opened, the liquid is unable to flow reversely in the upward direction due to the gravity. Hence, the present embodiment relies on the transmission set to compress the bellows tube so that the liquid can flow through the second liquid outlet tube at a fixed volume. This embodiment is for small volume measurement or compensation measurement.

Furthermore, the liquid outlet tube of the present invention can further include a third liquid outlet tube, disposed at the bottom of the container with variable capacity. A valve element is disposed at the connection. The valve element at this connection is a trace valve, and the present embodiment is a trace measurement mode. When the trace valve is opened, the liquid inside the bellows tube is unable to flow out due to the surface tension. Hence, the transmission set must compress the bellows tube so that a fixed volume of the liquid can flow out. As such, the trace volume measurement can be accomplished by precise controlling of the movement of the bellows tube.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
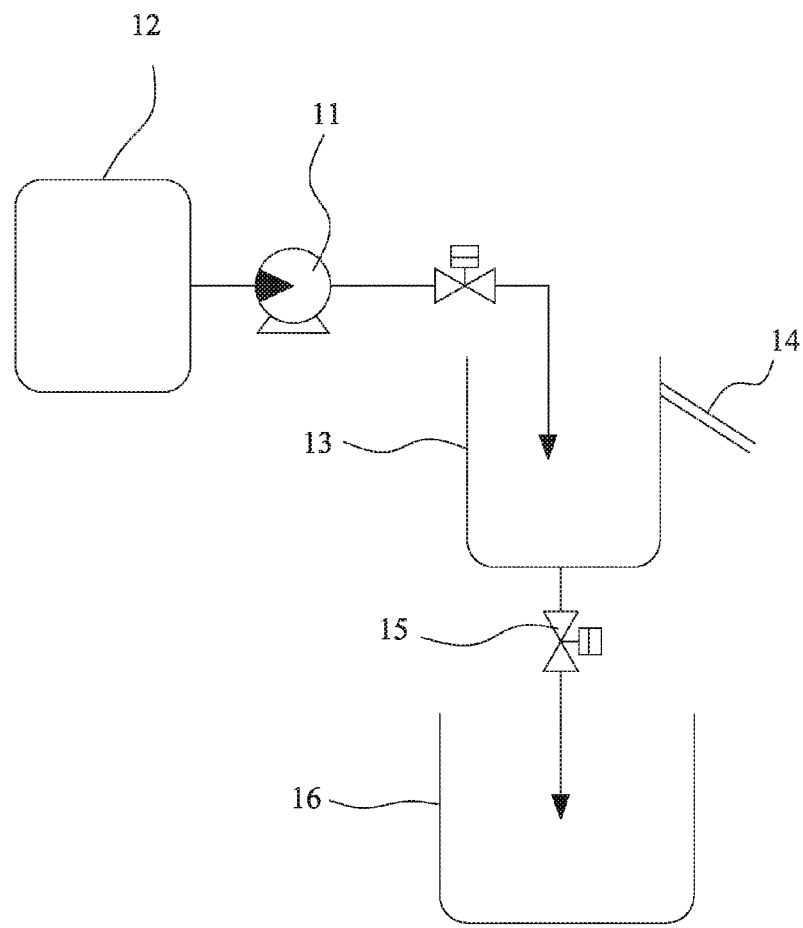
FIG. 1 shows a schematic view of a conventional overflow tank-based measurement meter.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
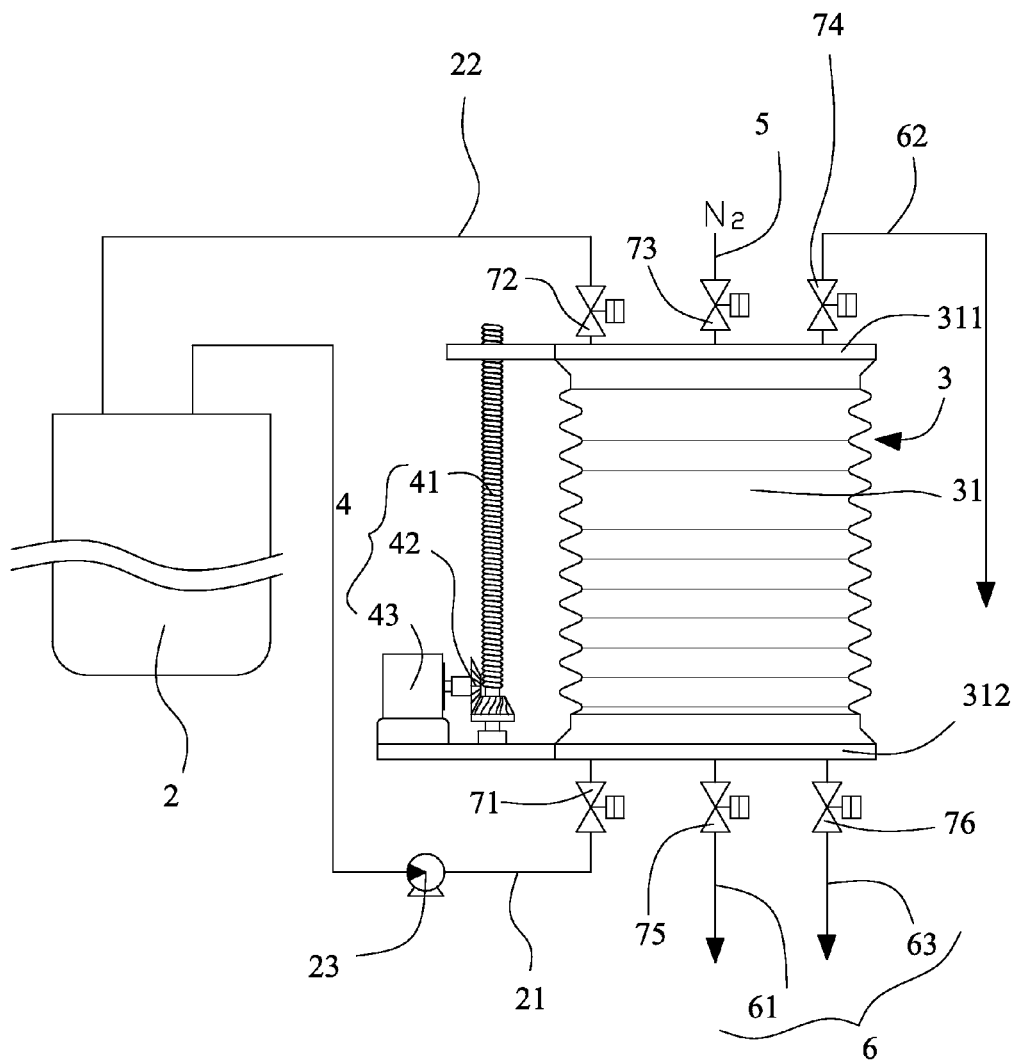
FIG. 2 shows a schematic view of the structure of the first embodiment of the present invention.

As shown in FIG. 2, the structure of a syringe meter of the present invention includes a supply tank 2, a container 3 with variable capacity, a transmission set 4, at least an air supply tube 5, at least a liquid outlet tube 6, and a plurality of valve elements 71-76.

The supply tank 2 is a tank containing a liquid supply, having a cyclic tube connected to the container with variable capacity. The cyclic tube includes a liquid output tube 21, a liquid returning tube 22 and at least a pump 23. The liquid output tube 21 and the liquid returning tube 22 are connected respectively to the top and the bottom walls of the container 3 with variable capacity. The pump 23 pumps the liquid inside the supply tank 2 to flow and circulate the supply tank 2 and the container 3 with variable capacity.

The container 3 with variable capacity is a bellows tube 31 having two ends sealed with an upper wall 311 and a bottom wall 312 respectively. The tube wall between the upper and bottom walls is a wall that can be compressed or extended linearly so as to change the capacity inside the bellows tube 31.

Figure 3:
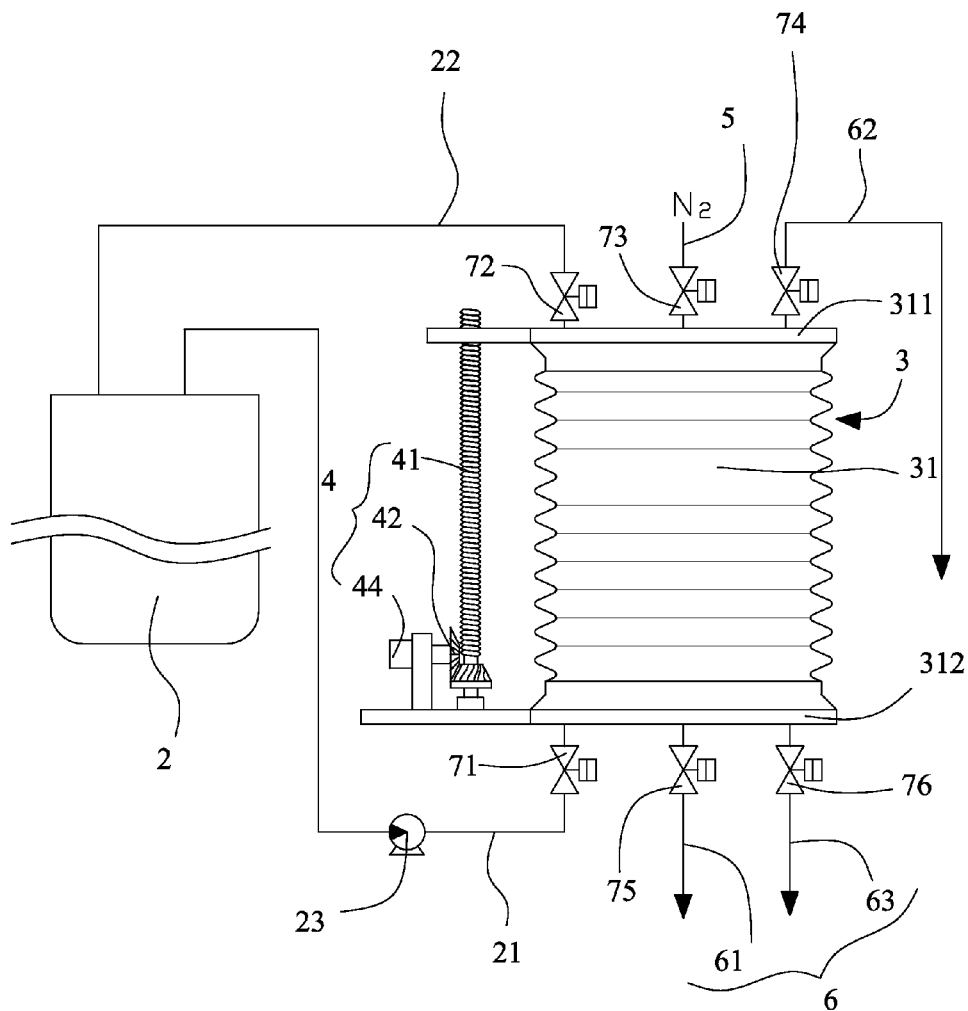
FIG. 3 shows a schematic view of the structure of the second embodiment of the present invention.

The transmission set 4 is for compressing or extending the bellows tube 31 to change the capacity. There are a plurality of possible known structures can be used for this purpose. The present invention describes only a possible mechanism. The transmission set 4 includes a screw rod 41 and a gear set 42 engaged to the screw rod 41. The screw rod 41 is screwed to the upper wall 311 of the bellows tube 31 and can enable the upper wall 311 to move linearly. The gear set 42 is for precise controlling of the screw rod 41 to rotate so as to adjust the capacity of the bellows tube 31. The adjustment can be either manual or electrical, and FIG. 2 shows an electrical adjustment mode, wherein the gear set 42 is further disposed with a power device 43, which may be a servomotor able to control the rotation of the screw rod 41 precisely. Alternatively, FIG. 3 shows a manual mode, wherein a knob 44 with linkage and scale is disposed at the gear set 43 and the adjustment is performed by turning the knob 44.

The liquid outlet tube 6 includes a first liquid outlet tube 61, a second liquid outlet tube 62 and a third liquid outlet tube 63, and each of the three tubes is connected to a mixed tank for final output. However, these three tubes 61, 62, 63 are connected to the bellows tube 31 at different positions. The first liquid outlet tube 61 and the third liquid outlet tube 63 are connected to the bottom wall 312 of the bellows tube and the second liquid outlet tube 62 is connected to the upper wall 311. The diameters of the tubes are also different, with the first liquid outlet tube 61 having a larger diameter than the second liquid outlet tube 62, which having a larger diameter than the third liquid outlet tube 63; wherein the first liquid outlet tube 61 is used for large volume measurement mode, the second liquid outlet tube 62 is used for small volume measurement or compensation measurement, and the third liquid outlet tube 63 is for trace measurement.

The at least an air supply tube 5 has one end connected to the upper wall 311 of the bellows tube 31, and the other end connected to an air supply device or to external air. In the present embodiment, the air supply tube 5 is connected to a nitrogen supply device to supply nitrogen in the bellows tube 31 to prevent the liquid inside from being polluted.

The plurality of valve elements is disposed at the cyclic tube, the air supply tube 5, the first liquid outlet tube 61, the second liquid outlet tube 62 and the third liquid outlet tube 63. By controlling the valve elements, different measurement modes can be performed. For precise controlling of the capacity of the bellows tube 31, the valve elements are disposed at the connection of the tubes and the bellows tube 31. Because the valve elements may serve different purposes, the structure of the valve elements may also vary. The valve element 71 is disposed at the connection of the liquid output tube 21 and the bottom wall 312. The valve element 72 is disposed at the connection of the liquid returning tube 22 and the upper wall 311. The valve element 73 is disposed at the connection of the air supply tube 5 and the upper wall 311. The valve element 74 is disposed at the connection of the second liquid outlet tube 62 and the upper wall 311. The valve element 75 is disposed at the connection of the first liquid outlet tube 61 and the bottom wall 612. The valve element 76 is a trace valve, disposed at the connection of the third liquid outlet tube 63 and the bottom wall 612. The trace valve has a smaller diameter. When the trace valve is opened, the liquid is unable to flow out automatically due to the surface tension.

Then, the present invention operates in different measurement modes. The large volume measurement mode is used for dumping adding, the small volume measurement mode is for displacement adding, and the trace measurement mode is for needle injection. Each mode can operate independently or sequentially mixed, depending on the application.

Figure 4:
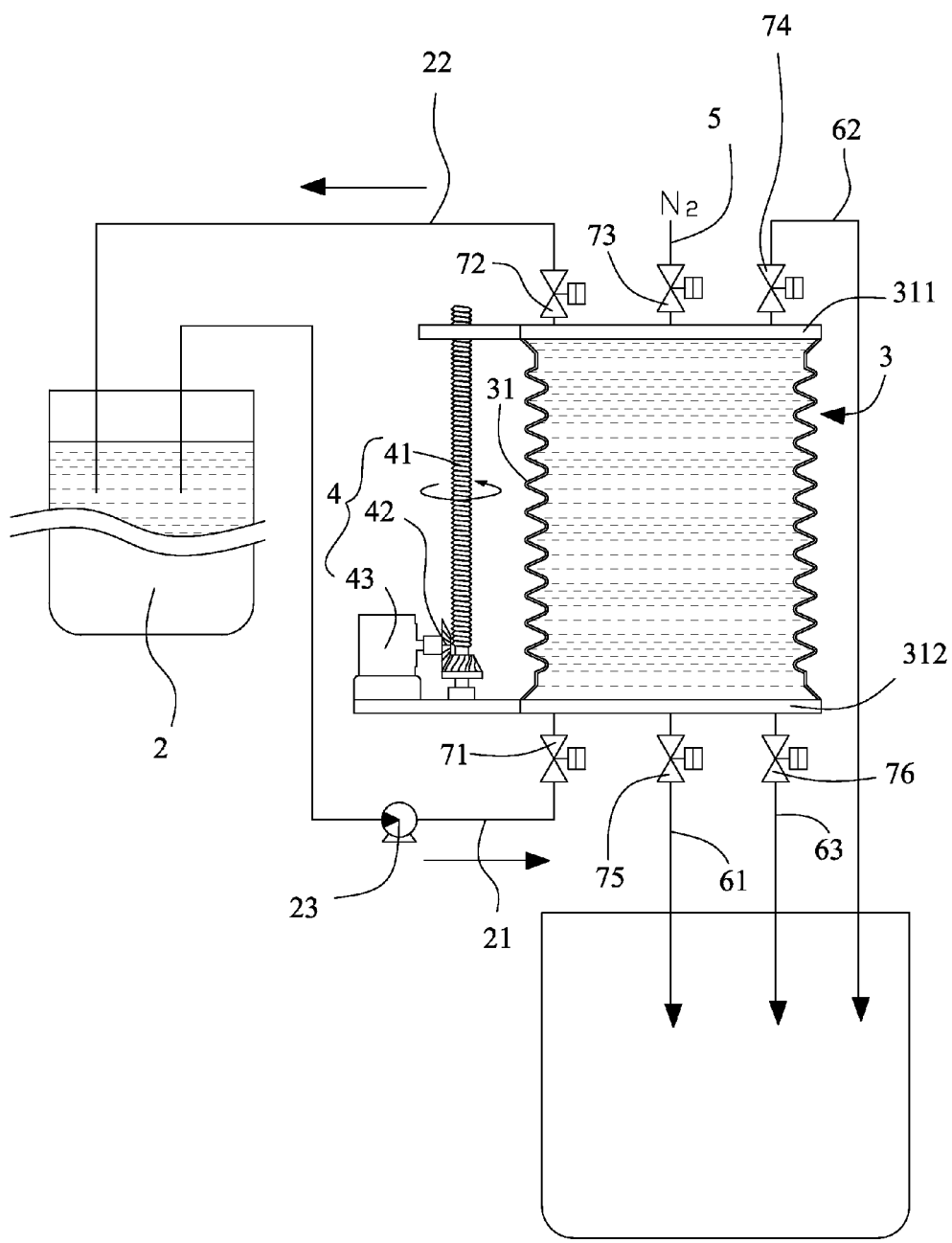
FIG. 4 shows a schematic view of the present invention in operation.
Figure 5:
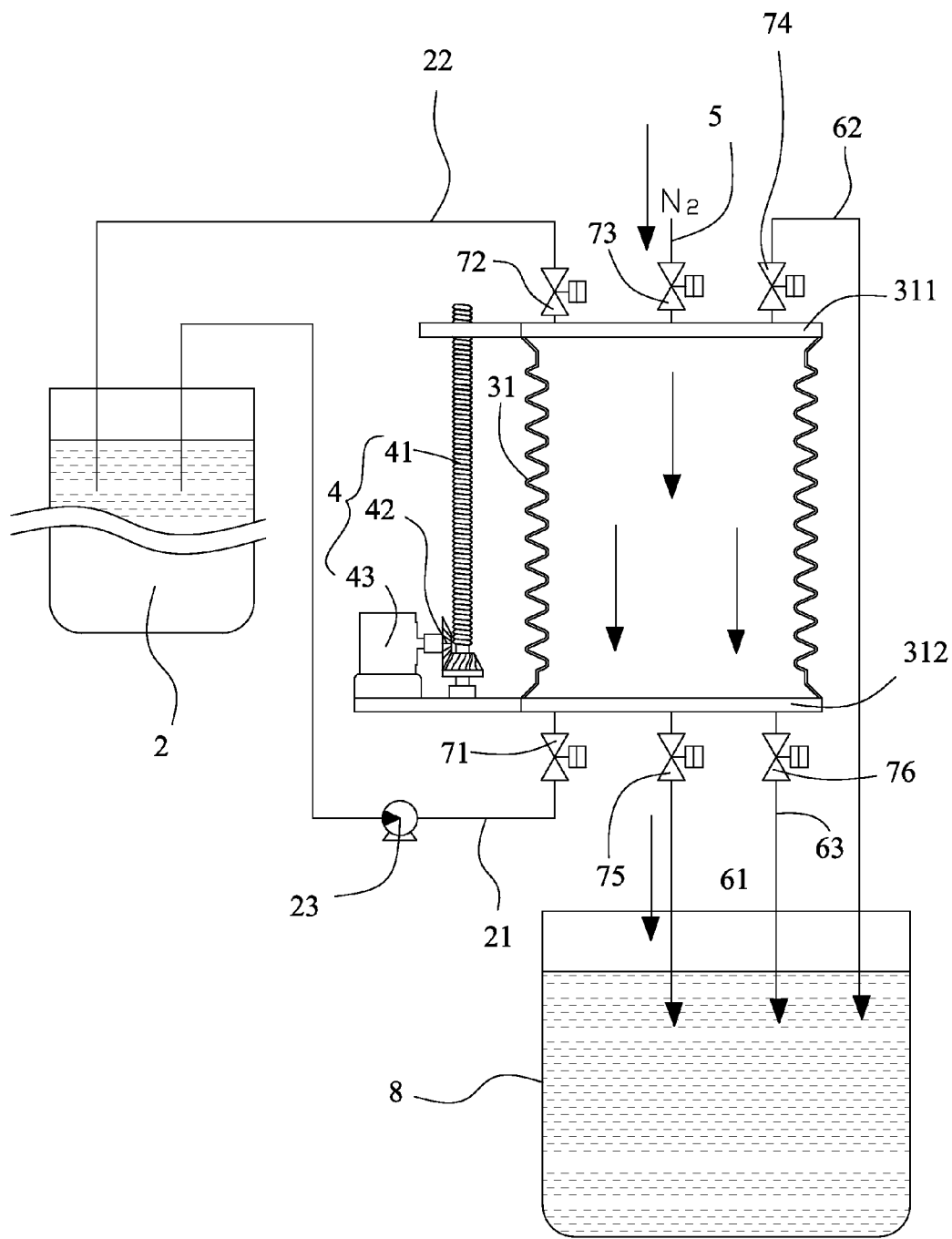
FIG. 5 shows a schematic view of the first measurement mode of the present invention.

As shown in FIG. 4, before the measurement starts, the valve elements 71, 72 are opened, and the valve elements 73, 74, 75, 76 are closed. The liquid inside the supply tank 2 circulates between the supply tank 2 and the bellows tube 31 through the operation of the cyclic tube and the pump 23 so as to prevent the liquid from settling. For large volume measurement, the transmission set 4 is activated to pull or compress the bellows tube 31 to a preset capacity. In the pull operation, the valve element 73 may be opened to inject nitrogen to reduce the pull time. The pump 23 continuously pumps the liquid inside the supply tank 2 into the bellows tube 31 with the preset capacity. When a sensor at the liquid returning tube 22 senses that the tube is full, the pump 23 stops pumping and the valve elements 71, 72 are closed. As shown in FIG. 5, the vale element 73 is opened to inject nitrogen and the valve element 75 is opened so that the liquid can rapidly flows to a mixing tank 8 through the first liquid outlet tube 61. When a sensor at the first liquid outlet tube 61 senses that no liquid is flowing, the valve elements 73, 75 are closed. As such, the large volume measurement (i.e., for dumping adding) is accomplished.

Figure 6:
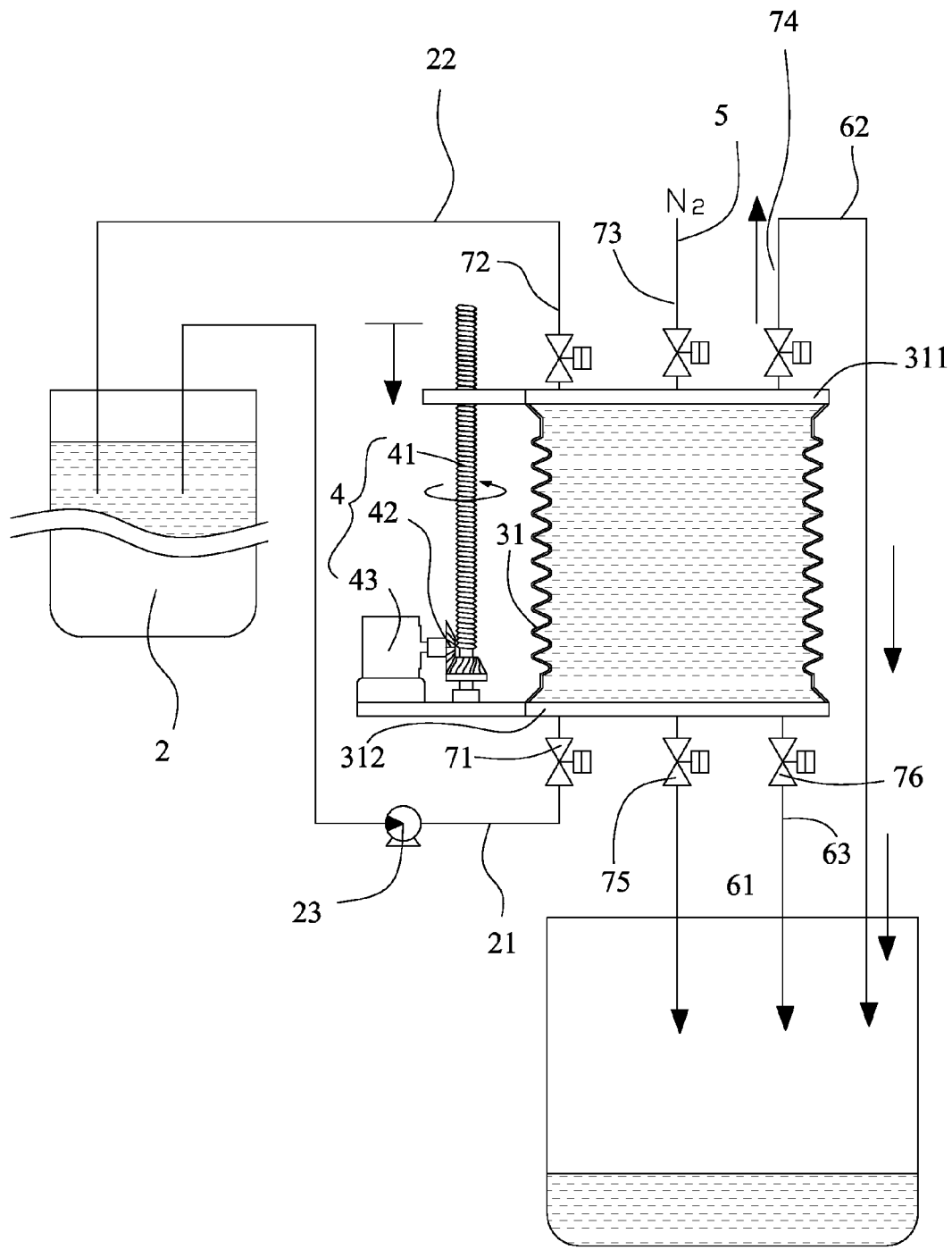
FIG. 6 shows a schematic view of the second measurement mode of the present invention.

As shown in FIG. 4 and FIG. 6, for small volume measurement (i.e., displacement adding), the bellows tube 31 is first filled with liquid. The operation is as shown in FIG. 4. The transmission set 4 is activated to adjust the bellows tube 31 to a preset capacity. The pump 23 continuously pumps the liquid inside the supply tank 2 into the bellows tube 31. When a sensor at the liquid returning tube 22 senses that the tube is full, the pump 23 stops pumping and the valve elements 71, 72 are closed. As shown in FIG. 6, the transmission set 4 is driven again to use the screw rod 41 to precisely control the compression of the bellows tube 31 so that the liquid inside the tube flows through the second liquid outlet tube 62 to the mixing tank 8. When a sensor at the second liquid outlet tube 62 senses that no liquid is flowing, the valve element 74 is closed. Because the measurement is driven by the transmission set 4, the flow rate is lower, and the output volume can be controlled precisely. This measurement mode is often used for small volume measurement or compensation measurement.

Figure 7:
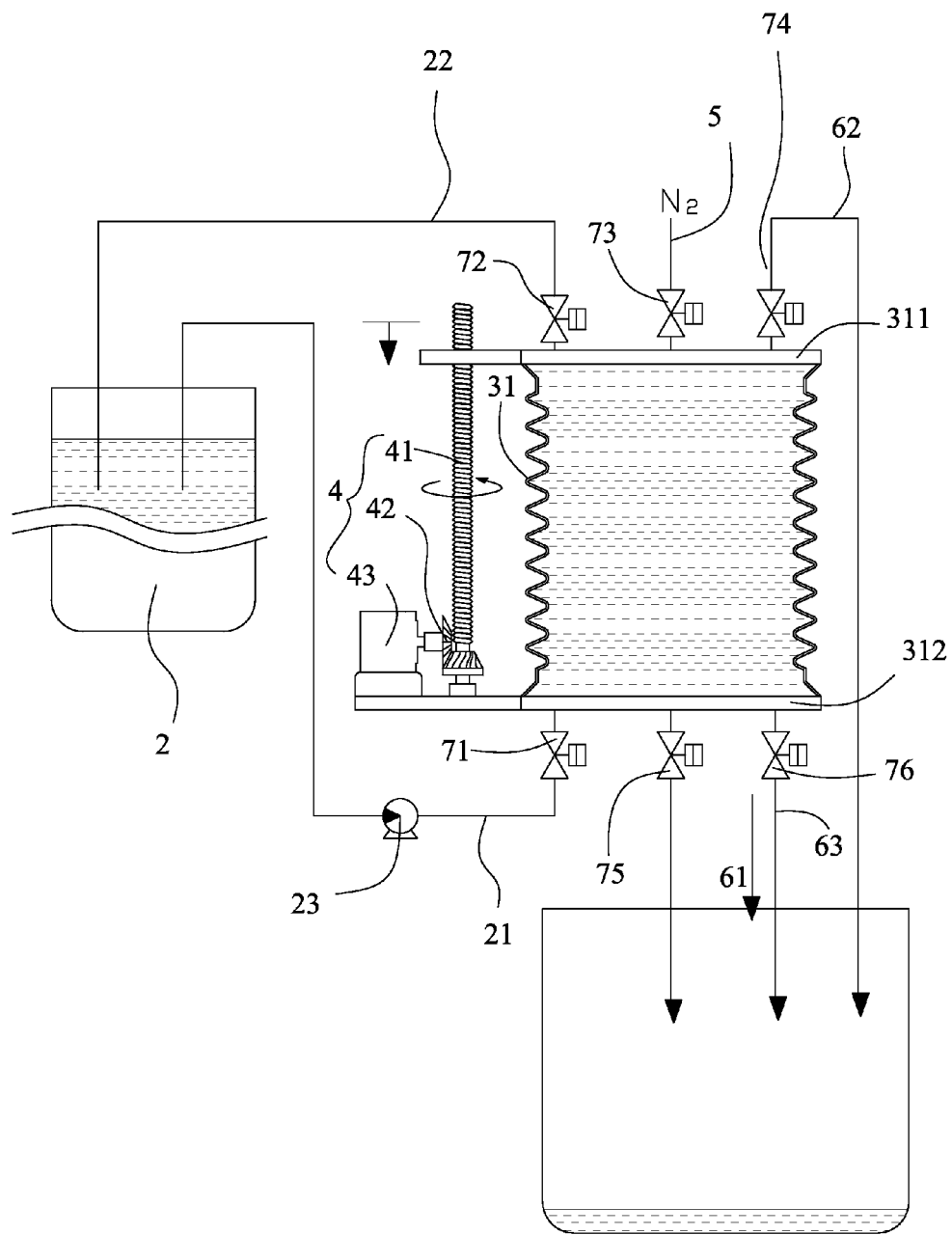
FIG. 7 shows a schematic view of the third measurement mode of the present invention.

As shown in FIG. 4 and FIG. 7, for trace measurement (i.e., needle injection), the capacity of the bellows tube 31 is adjusted and filled with liquid, which is similar to the operation in FIG. 4. As shown in FIG. 7, the valve element 76 is opened. Because the diameter of the valve element 76 is smaller, the liquid cannot flow out due to the surface tension. Then, the transmission set 4 is driven again to use the screw rod 41 to precisely control the compression of the bellows tube 31 so that the liquid inside the tube flows through the third liquid outlet tube 63 to the mixing tank 8. When the compression is finished, the valve element 76 is closed. As such, the trace measurement for needle injection is completed.

In summary, the syringe meter of the present invention provides the following advantages:

1. The volume of measurement can be easily adjusted.
2. High precision for large, small and trace volume measurement.
3. The sealed cyclic tube design keeps the liquid circulating so that the liquid will not settle when not measuring.
4. The sealed cyclic tube design reduces contact with the environment and reduces the risk of pollution.
5. A plurality of materials can be supplied simultaneously to increase the mixing speed.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A syringe meter, comprising:
   a supply tank;
   a container with variable capacity, the container with variable capacity being a bellows tube having two ends sealed; the supply tank having a cyclic tube and at least a pump connected to the bellows tube so that a liquid is able to flow in the supply tank and the bellows tube cyclically;
   a transmission set, able to compress or pull the bellows tube to change the capacity of the bellows tube;
   at least an air supply tube, connected to the container with variable capacity;
   a liquid outlet tube including at least one of a first liquid outlet tube, a second liquid outlet tube or a third outlet tube, connected to the container with variable capacity; and
   a plurality of valve elements, disposed at the connections of the tubes and the bellows tube to control the closing and opening of the tubes;
   wherein the capacity of the bellows tube is adjusted for outputting a preset volume, or activating the transmission set to compress or pull the bellows tube after filling the bellows tube with a liquid to control the output volume.

2. The syringe meter as claimed in claim 1, wherein the air supply tube is connected to the top of the container with variable capacity; the first liquid outlet tube is connected at the bottom of the container with variable capacity; each of the connections between the air supply tube and the first liquid outlet tube and the container with variable capacity is disposed with a valve element; and when both the valve elements are opened, the liquid contents inside the container will flow directly through the first liquid outlet tube due to the pressure.

3. The syringe meter as claimed in claim 1, wherein the second liquid outlet tube is connected to the top of the container with variable capacity, a valve element is disposed at the connection, and when the valve element is opened, and the transmission set is activated to compress the bellows tube, the liquid can flow through the second liquid outlet tube.

4. The syringe meter as claimed in claim 1, wherein the third liquid outlet tube is connected to the bottom of the container with variable capacity, a trace valve element is disposed at the connection, when the trace valve is opened, the liquid inside the bellows tube is unable to flow out due to the surface tension, the transmission set must compress the bellows tube so that the liquid can flow out.

5. The syringe meter as claimed in claim 1, wherein the transmission set comprises a screw rod able to compress or pull the bellows tube linearly, a gear set engaged to the screw rod, and a power device able to rotate the gear set; when power device rotates the gear set, the gear set also rotates the screw rod synchronously to compress or pull the bellows tube linearly.

6. The syringe meter as claimed in claim 1, wherein the transmission set comprises a screw rod able to compress or pull the bellows tube linearly, and a gear set engaged to the screw rod; when the gear set is rotates manually, the gear set also rotates the screw rod synchronously to compress or pull the bellows tube linearly.

* * * * *